United States Patent Office 3,532,525
Patented Oct. 6, 1970

3,532,525
INSULATION BOARD ADHESIVE
Harlan E. Tarbell, Torrance, and Donald W. Mogg, Redondo Beach, Calif., assignors to Grefco, Inc., Philadelphia, Pa., a corporation of Delaware
No Drawing. Continuation-in-part of application Ser. No. 454,989, May 11, 1965. This application Oct. 9, 1968, Ser. No. 766,286
The portion of the term of the patent subsequent to Oct. 22, 1985, has been disclaimed and dedicated to the Public
Int. Cl. C08h 9/00; C09d 3/04; C09b 11/00
U.S. Cl. 106—134                    9 Claims

ABSTRACT OF THE DISCLOSURE

Bituminous emulsions, with a continuous organic phase, that can be used in built-up roof construction for adhesion of porous surfaces to metal without waste of adhesive materials by absorption, contain typically 40 to 70% by weight of asphalt, 5 to 30% of a water-immiscible organic solvent, 5 to 20% of a non-swelling clay and at least 10% water containing sufficient hydrophilic colloid to give it a minimum viscosity of 5 centipoises at 75° F. The emulsions are prepared by mixing the aqueous clay suspension into the already formed asphalt solution.

---

This application is a continuation-in-part of the U.S. Ser. No. 454,989 filed on May 11, 1965 now abandoned.

The use of bitumens such as asphalt and pitches in adhesive formulations is of course well known in the art. Yet in some current high volume applications, it still raises problems and inconveniences which at times can be fairly serious.

When asphalt is used as the adhesive for securing insulation board to the deck of a roof, it is conventionally applied to the deck by a hot mop process. The solid asphalt is first melted and spread over the surface of the deck with a mop. The board is then laid on the deck. To do this, it is necessary to invest in heating equipment and to wait for the asphalt to melt, two operations with which the average building contractor can very well dispense. Furthermore, the very mechanics of these operations result in the net deposition of quantities of asphalt far in excess of that needed for adhesion of the board to the roof. Given the flammable nature of this particular organic adhesive there may result, in case of fire excessive spread of flames throughout the building.

Cut-back asphalts, i.e. asphalts blended with petroleum solvents, might be employed to some advantage in eliminating some of the shortcomings of the hot mop process. But then, any improvement that can be achieved is radically depreciated by the high sorption rate of the asphalt solution into the board. A very weak bond results.

An object of this invention, therefore, is to provide bitumen base adhesives that can be applied at ambient temperatures to yield maximum bond strength for a given quantity of material used. Another object is to provide adhesive formulations that will remain at the surface of porous substrates and thus be available for their bonding function.

These and other objects which will become apparent on further familiarization with the present invention, have been accomplished by emulsifying a water suspension of finely divided inorganic solids such as ball clays, into a non-aqueous solution of a bitumen. Cut-back asphalts serve very satisfactorily as the continuous phase of these emulsions.

It has been discovered that compositions falling within the limits of this invention penetrate porous materials sufficiently to form good bonds, for instance between insulation board and roof deck, and yet are not excessively adsorbed and presorbed by the porous materials. This delicate and unexpected control of substrate penetration is a novel feature that is believed to be intimately concerned with a measured opposition of the permeabilities of the two liquid phases present.

The following examples will illustrate the new formulations. They do not, however, define the limits of the invention. All parts and percentages in the examples are on a weight basis.

EXAMPLE 1

| | Parts |
|---|---|
| Asphalt (140–160° F. softening point) | 59 |
| VM & P naphtha (60° F. flash point) | 26 |
| CTS–1 ball clay | 8 |
| Wyoming bentonite | 1 |
| Water | 16 |

CTS–1 ball clay is a material that does not swell in water and is finely divided to the extent that approximately 89% of its weight consists of particles having a diameter smaller than 2 microns.

The naphtha was blended with the asphalt. The other ingredients were mixed together and the resulting suspension was blended into the asphalt solution with a No. 30 Hamilton-Beach mixer.

Excellent adhesion was achieved on bonding glass fiber, vegetable fiber, polyurethane and perlite insulation board to galvanized steel with the above emulsion. In the case of all these insulation boards it was found that, once the adhesive had dried, a tensile pull caused the structure to break in the board rather than at the bond.

EXAMPLE 2

A commercial asphalt solution was employed in this preparation. The rest of the ingredients were mixed together and blended into the non-aqueous asphalt solution as taught in Example 1.

| | Parts |
|---|---|
| Cut-back asphalt AC–8 | 100 |
| 1201 ball clay | 10 |
| Methocel MC | 0.25 |
| Tetrasodium pyrophosphate | 0.25 |
| Water | 26 |

AC–8 asphalt is a product of Hunt Petroleum Company. It contains, on a weight basis, 62% asphalt having a softening point of 190–195° F. and 38% naphtha with a 200–400° F. boiling range. The ball clay is a non-swelling fine-grained relatively pure hydrated aluminum silicate having a particle size distribution such that approximately 98% of its weight consists of particles having a diameter smaller than 20 microns. Methocel MC is a water soluble "8000 centipoises" methyl cellulose from Dow Chemical Company.

To prepare the adhesive, the tetrasodium pyrophosphat was dissolved in 20 parts of water. A methyl cellulose solution was made in 6 parts of water. The two aqueous solutions were combined and the clay was mixed in with a spatula. The whole was then added to the cut-back asphalt and mixed with a No. 30 Hamilton-Beach mixer.

Again, as in Example 1, glass fiber, vegetable fiber, urethane or perlite insulation board glued to galvanized steel with the present emulsion and dried, broke in the substrate rather than at the bond when subjected to a tensile pull.

EXAMPLE 3

Another emulsion was prepared, in the manner of Example 1, with the following ingredients:

| | Parts |
|---|---|
| Coal tar pitch (148° F. softening point) | 65 |
| Trichloroethylene | 38 |
| CTS-1 ball clay | 10 |
| Wyoming bentonite | 1 |
| Water | 23 |
| Sodium metasilicate | 0.175 |

The binding properties of this preparation were essentially those of the Example 1 adhesive.

EXAMPLE 4

A blend of asphalt and naphtha was prepared as in Example 1 with 59 parts 140–160° F. softening point asphalt and 26 parts VM & P 60° F. flash point naphtha. Ball clay CTS–1, 8 parts, and Wyoming bentonite, 1 part, were added directly to the cutback asphalt thus produced and mixed with a No. 30 Hamilton-Beach mixer. No water was used.

On binding porous substrates to galvanized steel with this suspension, excessive penetration of the adhesive into the porous body was observed. The bond yielded under tensile pull.

Bitumens that can be used in formulating the adhesive compositions of this invention include materials such as asphalt, gilsonite, petroleum pitch, wood tar pitch, lignite tar pitch, coal tar pitch and mixtures thereof. These materials may contain minor quantities of polymeric substances such as reclaimed rubber or polyethylene, said polymers being at times added to commercial products of this type to improve their properties. The actual bituminous substance selected should have a softening point within the range of 100 to 400° F., preferably between about 120 to about 250° F. for most applications. The bitumen is blended with a solvent that is substantially immiscible with water. Under certain use circumstances, factors such as fire hazard and toxicity may have to be considered. With this in mind, there can be selected as solvents, hydrocarbons, halogenated hydrocarbons and other organic liquids meeting the requirements mentioned. Illustrative members these classes include toluene, carbon tetrachloride, trichloroethylene, perchloroethylene, tetrabromoethylene and petroleum naphthas— the latter having a boiling point preferably within the range of 200–400° F., although petroleum fractions boiling as low as 100° F. can be used where quick drying is desired.

The aqueous suspension or dispersion of inert, inorganic solids which constitutes an essential part of our emulsified bitumen adhesives is made with a finely divided, chemically unreactive, inorganic substance such as a clay, a volcanic ash or a slag. Whatever its origin, the materials selected should not swell appreciably in water and should have a particle size not exceeding 100 microns in diameter nor about 50 microns in average. Obviously, a small proportion of particles with diameters above 100 microns does not disqualify an otherwise acceptable material. Ball clays meeting the requirements just stated are the preferred materials of the class.

The aqueous suspension is made with water containing one or more thickening agents in quantity sufficient to raise its viscosity to at least 5 centipoises at 75° F. How much thickening agent is needed to achieve the desired viscosity depends of course on the nature of the particular agent employed. The preferred thickeners are those belonging to the general class of hydrophilic colloids, i.e. large chemical molecules which often behave in water as one-molecule colloid particles. Satisfactory materials within this class include: water swelling clays such as Wyoming bentonite; water soluble grades of natural and chemically modified natural gums such as gum arabic, gum tragacanth and so on; proteinaceous substances such as alginates and gelatins; chemically modified water soluble celluloses such as methyl cellulose, ethyl cellulose, hydroxyethyl cellulose and salts of carboxymethyl cellulose; and other synthetic or semi-synthetic water soluble compounds such as polyvinyl alcohol and starch phosphate. A dispersant or wetting agent may also be used to stabilize the aqueous suspension. This function is accomplished satisfactorily by soluble phosphates such as trisodium phosphate and tetrasodium pyrophosphate, soluble silicates such as sodium metasilicate and a large number of similar compounds that need not be enumerated here.

The principal components of our adhesive compositions should be present in the following weight proportion: bitumen, 30–80%; inert inorganic solid, 5–50%; organic liquid diluent, 5–50%; at least 5% water; and enough thickening agent to raise the viscosity of the water to a minimum of 5 centipoises at 75° F. The quantity of organic liquid used to dilute the bitumen will vary according to the concentrations of solids desired and the softening point of the bitumen used. Care should be taken that the amount of water used in a particular preparation be not sufficient to make it the continuous phase of the emulsion. The preferred formulation, i.e. those that will perform satisfactorily in the bulk of the applications contemplated, are made with, again on a weight basis, 40–70% bitumen, 5–20% inert inorganic solid, 5–30% organic liquid diluent, and at least 10% water.

The use of additives to accomplish special functions with respect to the stability of the present compositions such as fungicides, fire retardants and so on, is not considered part of the invention.

What we have discovered, in short, is an adhesive emulsion especially suited to bond fibrous or porous materials to themselves or to smooth surface structures such as metals, glass, vinyl sheeting, etc. The ease of application of said emulsion, its low cost and its good bonding power shall certainly suggest other uses to those skilled in the art.

What is claimed is:

1. A process for preparing water-in-oil emulsions which consists in dispersing intimately an aqueous suspension of a finely divided inert, insoluble, non-swelling clay into a non-aqueous blend of a bitumen with an inert organic liquid, the resulting emulsion comprising, on a weight basis:
   about 30 to 80% bitumen,
   about 5 to 50% of a water-immiscible inert organic liquid miscible with the bitumen and capable of evaporation under normal atmospheric conditions,
   about 5 to 50% of a finely divided inert, insoluble, non-swelling clay having an average particle size not exceeding 50 microns in diameter, and at least 5% water containing sufficient hydrophilic colloid to raise its viscosity to a minimum of 5 centipoises at 75° F.

2. The process of claim 1 in which the bitumen is selected from the group consisting of asphalt, gilsonite, petroleum pitch, coal tar pitch, wood tar pitch, lignite tar pitch and mixtures thereof.

3. The process of claim 1 in which the bitumen is an asphalt having a softening point within the range of about 120 to 250° F.

4. The process of claim 1 in which the finely divided clay is ball clay.

5. The process of claim 1 in which the hydrophilic colloid is selected from the class consisting of water-swelling clays, water-soluble natural and chemically modified gums, water-soluble ethers of cellulose, carboxymethylcellulose salts, polyvinyl alcohol, aliginates, gelatin, starch phosphate and mixtures thereof.

6. The process of claim 1 wherein there is used: about 40 to 70% of a bitumen selected from the class consisting of asphalts having a softening point within the range of about 120 to 250° F.

about 5 to 30% organic liquid immiscible with water and capable of evaporation under normal atmospheric conditions.

about 5 to 20% finely divided inert clay having an average particle size not exceeding 50 microns in diameter, and at least 10% water containing sufficient thickening agent to raise its viscosity to a minimum of 5 centipoises at 75° F., said thickening agent being a hydrophilic colloid belonging to the group consisting of water-swelling clays, water soluble natural and chemically modified gums, water soluble ethers of cellulose, carboxymethyl cellulose salts, polyvinyl alcohol, alginates, gelatin and starch phosphate.

7. The process of claim 6 in which the clay is ball clay.

8. The process of claim 6 wherein the water-immiscible organic liquid is a naphtha having a boiling point range between 200 and 400° F.

9. In built-up roof construction, the process of binding perlite board to metal deck and to roofing felt with an emulsion prepared by the process of claim 6.

References Cited

UNITED STATES PATENTS

| | | | |
|---|---|---|---|
| 2,574,930 | 11/1951 | Mitchell et al. | 106—277 |
| 2,670,332 | 2/1954 | McCoy et al. | 106—277 XR |
| 2,714,582 | 8/1955 | Day | 106—277 XR |
| 2,894,848 | 7/1959 | Goodwin et al. | 106—281 XR |
| 2,941,893 | 6/1960 | McConnaughay | 106—277 XR |
| 3,006,860 | 10/1961 | Heinz | 106—277 XR |
| 3,060,047 | 10/1962 | Graff et al. | 106—277 |
| 3,296,165 | 1/1967 | Kemp | 106—283 XR |
| 3,270,476 | 1/1966 | Ensled et al. | 106—281 XR |
| 3,407,083 | 10/1969 | Tarbell et al. | 106—277 XR |

JULIUS FROME, Primary Examiner

J. B. EVANS, Assistant Examiner

U.S. Cl. X.R.

106—160, 207, 212, 273, 283